No. 650,238. Patented May 22, 1900.
R. R. GUBBINS & H. LOOG.
BICYCLE OR LIKE FRAME.
(Application filed Jan. 15, 1900.)

(No Model.) 3 Sheets—Sheet 1.

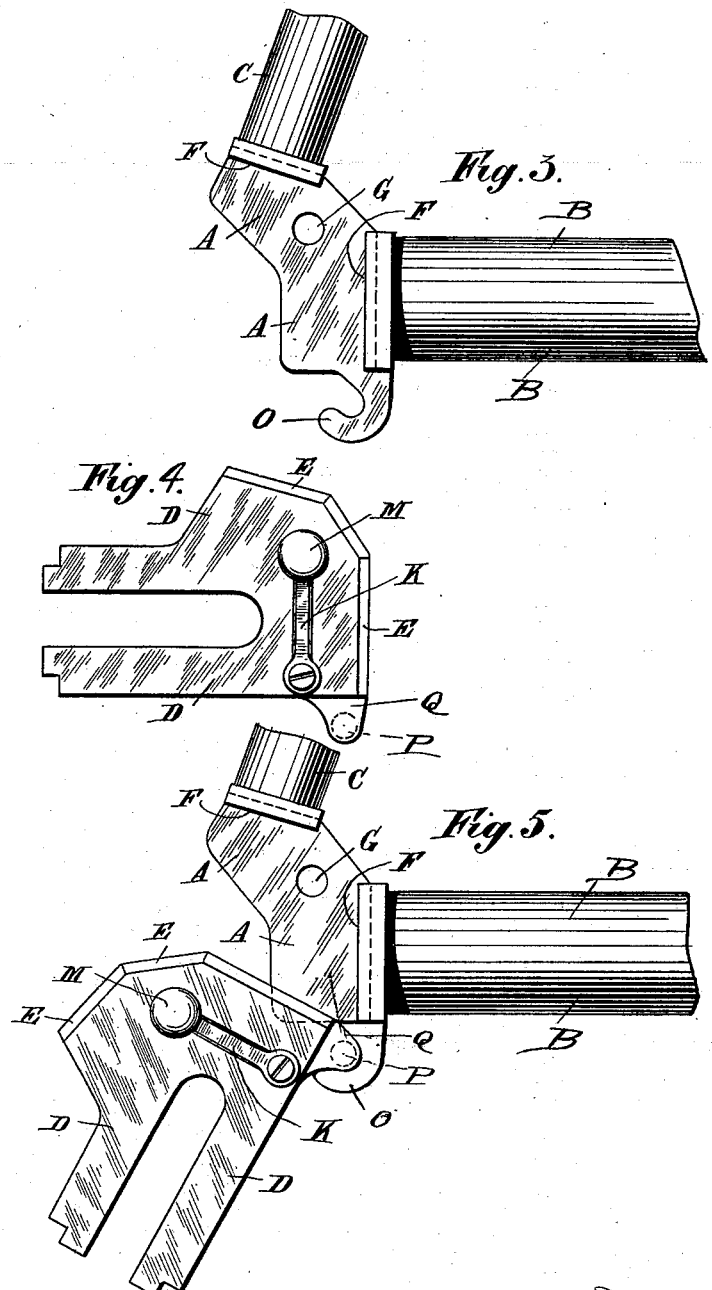

No. 650,238. Patented May 22, 1900.
R. R. GUBBINS & H. LOOG.
BICYCLE OR LIKE FRAME.
(Application filed Jan. 15, 1900.)
(No Model.) 3 Sheets—Sheet 3.
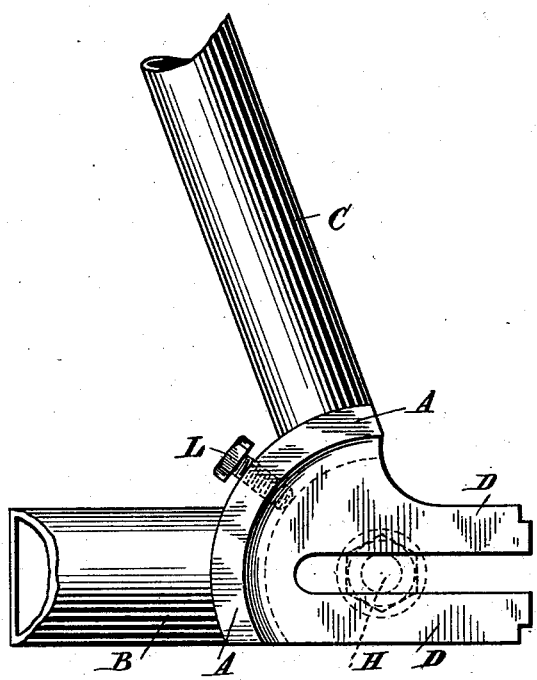
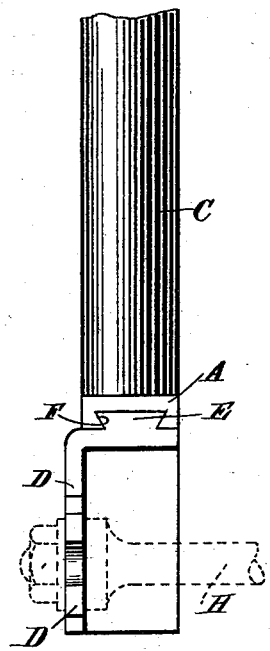

UNITED STATES PATENT OFFICE.

RICHARD RUSSELL GUBBINS AND HERMANN LOOG, OF LONDON, ENGLAND.

BICYCLE OR LIKE FRAME.

SPECIFICATION forming part of Letters Patent No. 650,238, dated May 22, 1900.

Application filed January 15, 1900. Serial No. 1,553. (No model.)

*To all whom it may concern:*

Be it known that we, RICHARD RUSSELL GUBBINS, residing at 95 Pelton road, East Greenwich, and HERMANN LOOG, residing at 36 Newgate street, London, England, subjects of the Queen of Great Britain, have invented certain new and useful Improvements in Bicycle or Like Frames, of which the following is a specification.

This invention relates to means or appliances portion or portions of which serve as parts of the frames of chain-driving bicycles or like machines or vehicles and capable of being removed or detached and replaced with facility, such as when a wheel has to be repaired or the inflatable tubes repaired or necessary changes have to be made without necessitating any alteration of the tension of the chain or a readjustment of the axial position of the rear wheel.

Our invention is shown on the annexed drawings.

Figure 1:
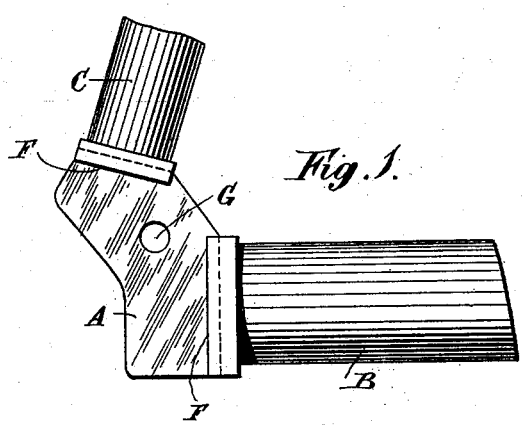
Figure 2:
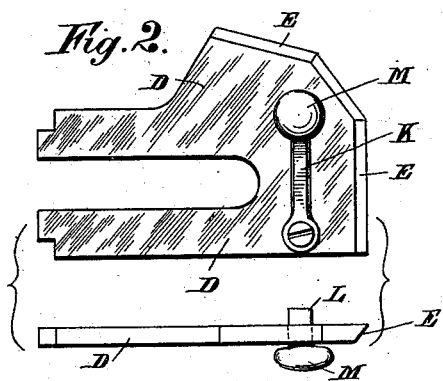
Figure 6:
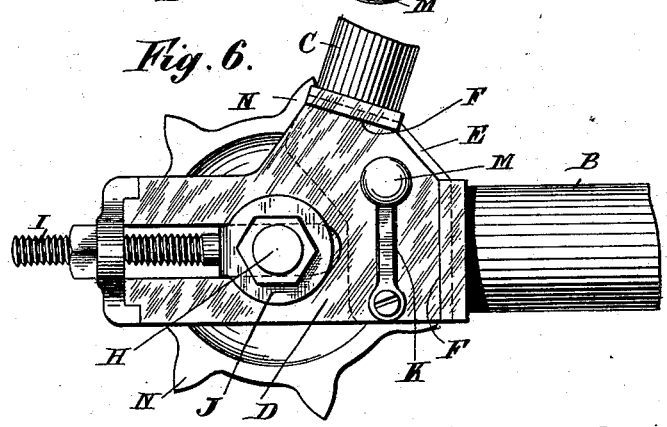

Figure 1 is a side elevation of one of our improved ends provided with undercuts and which is secured to the back fork and the backstay, respectively, of, say, a bicycle. Fig. 2 is a side elevation of one of our separable plates which we attach to the fork ends by inclined edges to enter the undercuts of the back-fork ends, so that when slipped in position it becomes locked by a spring bolt or pin which enters a hole in the back-fork ends and fixes the two parts rigidly together. Fig. 3 is a side elevation of one of our improved back-fork ends with a hook-like projection from the bottom edge, into which hook a pin of a lug projecting from our separable plate shown at Fig. 4 can be temporarily secured before such separable plate be entirely removed or when a wheel has to be lowered previous to being removed bodily, such as is indicated at Fig. 5, this being a side elevation of the improved back-fork end and having the separable plates turned down previously to being unhooked. Fig. 6 shows our improved back-fork end and the separable plate in the position they occupy as a complete back-fork end with the axle of the rear wheel properly adjusted in the slot of the back plate and which adjustment need not be interfered with whether it be necessary to remove the pneumatic tube only or to remove the rear wheel and the rear chain-wheel bodily. Fig. 7 is a view in side elevation, and Fig. 8 is a view in end elevation, of a slightly-modified form of our improved attachment.

A indicates our improved end attached to backstay B and to back fork C, respectively.

D indicates a separable plate affixed to said ends A by inclines E E on D and undercut of lips F F of the end A.

G indicates a bolt or pin hole in end A for locating the separable plate D when plate D is pushed into position, as shown at Fig. 6.

H indicates a rear-wheel axle previously adjusted in the well-known manner by the adjustment-screw I and block J in the slot of the separable plate D.

K is the spring of bolt or pin L, loosely affixed to plate D for its pin to enter hole G of end A to fix the plate D in position when replaced to the end A. This bolt or pin has a head M by which it can be partially withdrawn.

N indicates the rear chain-wheel on rear axle H.

We have only shown one side plate D as separable from the end A, such as when the tire has to be removed from the rear wheel. Said tire after being detached can be drawn down sidewise (if the plate D be first loosened from the end A) and can then be slewed out from the gap now formed between the end A and the detached plate D without the previous adjustment of the wheel in the plate D being interfered with, as at present.

If our improved ends be applied to both tails of the back fork, the back forks can be raised after the detachment of the two side plates D D to shorten the distance in the length of the driving-chain to slip it off from the rear chain-wheel, and then the wheel, with the previous adjustment still intact, can be bodily removed from the machine and be replaced at will.

In Figs. 7 and 8 we show a quadrant shape of sliding connection of the plate D within undercuts or a dovetailed groove in our improved end A, the two parts being securable by a bolt or screw-pin L to lock the two parts rigidly together. On removing the bolt or pin L the part D can be slid away from the end A on either side of the back fork or both side plates D can be removed simultaneously.

In Figs. 3, 4, and 5 we show the back-fork end provided at its lower end with a hook-shaped projection O, in which is rotatably seated a pin P, which projects laterally from the separable plate D, whereby the plate may be temporarily supported in place on the back-fork end before said plate be entirely removed, as where a wheel has to be lowered previous to being removed bodily, as indicated in Fig. 5.

What we claim, and desire to secure by Letters Patent, is—

1. The end or ends A with undercut lips F, F, separable plate or plates D with inclined edges E E fastening bolts or pins L as attachments to the rear forks and backstays of a cycle.

2. In a bicycle, the combination with the back-fork end A provided at its lower end with a pendent hook-shaped projection O, of the plate D detachably connected to said back-fork end and provided with a laterally-projecting pin P seated in said hook-shaped projection, substantially as described and for the purpose specified.

3. In a bicycle, the combination with the back-fork end A provided with undercut lips F, F, and the separable plate or plates D having inclined edges E, E, said back-fork end and separable plate or plates being provided with perforations adapted to normally register, of a spring K attached at one end to the plate D and provided at its free end with a bolt or pin L arranged to enter said perforations and lock the parts together, substantially as described.

In testimony whereof we have hereunto set our hands in presence of two subscribing witnesses.

RICHARD RUSSELL GUBBINS.
HERMANN LOOG.

Witnesses:
WM. O. BROWN,
H. MAYKELS.